3,019,172
PRODUCTION OF 7-CHLORO-6-DEMETHYL-
TETRACYCLINE
Joseph Jacob Goodman, Nanuet, and Mary Matrishin, Pearl River, N.Y., assignors to American Cyanamid Company, New York, N.Y., a corporation of Maine
No Drawing. Filed Mar. 14, 1960, Ser. No. 14,503
12 Claims. (Cl. 195—80)

This invention relates to a novel process of preparing 7-chloro-6-demethyltetracycline and more particularly is concerned with the biosynthesis of 7-chloro-6-demethyltetracycline by certain strains of microorganisms of the genus Streptomyces.

7-chloro-6-demethyltetracycline is a member of a new family of tetracycline antibiotics described and claimed in the United States patent to Jerry Robert Daniel McCormick et al. No. 2,878,289. 7-chloro-6-demethyltetracycline is produced by certain mutant strains of *S. aureofaciens* derived from the chlortetracycline-producing *S. aureofaciens* A-377 soil isolate described in the United States patent to Duggar No. 2,482,055 and deposited at the Northern Regional Research Laboratory, Peoria, Illinois, as NRRL 2209. The new 7-chloro-6-demethyltetracycline-producing strains of *S. aureofaciens* are derived by treatment of A-377 with mutagenic agents. Cultures of the new 7-chloro-6-demethyltetracycline-producing strains of *S. aureofaciens* are on deposit at the American Type Culture Collection, Washington, D.C., under ATCC accession numbers 12551, 12552, 12553 and 12554.

The present invention is based upon the discovery that 7-chloro-6-demethyltetracycline can be readily prepared by cultivating under submerged aerobic conditions a conventional chlortetracycline-producing or tetracycline-producing strain of *S. aureofaciens* when the medium is modified to include a small amount of a methylation inhibitor as more particularly described hereinafter. The mechanism by which 7-chloro-6-demethyltetracycline is produced in a medium to which the novel inhibitors have been added and which is fermented with conventional *S. aureofaciens* strains which ordinarily produce chlortetracycline or tetracycline, is not completely understood and no theory is advanced with respect thereto. It is a demonstrable fact, however, that by the use of the methylation inhibitors of the present invention 7-chloro-6-demethyltetracycline is produced in good yield.

The present invention is not particularly concerned with any specific microorganism except to the extent that it is concerned with those microorganisms that produce chlortetracycline and tetracycline by fermentative biosynthesis. Insofar as is presently known, all such microorganisms are of the genus Streptomyces. The species *S. aureofaciens*, which produces chlortetracycline in fermentation media in which chloride ions are present as well as numerous natural and induced mutants is, of course, preferably used and such microorganisms will, of course, also produce tetracycline when deprived of chloride ions. A number of other chlortetracycline-producing microorganisms and tetracycline-producing microorganisms have been mentioned in the patent literature as alleged distinct species of Streptomyces such as *S. viridifaciens*, *S. sayamaensis*, *S. feofaciens*, and still others. The published morphological data on these microorganisms is insufficient to determine conclusively whether or not they are new species or merely strains of *S. aureofaciens*. Regardless of this, however, the present invention is not predicated upon the selection of a particular species of microorganism so long as that microorganism will produce both chlortetracycline and tetracycline.

The conditions of the fermentation are generally the same as for the presently known methods of producing tetracycline or chlortetracycline by fermentation. Thus the fermentation medium contains the usual nutrients and mineral substances. Suitable nutrient substances include starch, dextrose, cane sugar, glucose, molasses, soybean meal, peanut meal, yeast, meat extracts, peptone, ammonium sulfate, urea, corn steep liquor, distillers solubles, inorganic salts and other conventional substances. The inorganic salts include such things as calcium carbonate, ammonium sulfate, ammonium chloride, and the various trace elements such as manganese, cobalt, zinc, copper, iron and the like.

The other general conditions of the fermentation such as hydrogen ion concentration, temperature, time, rate of aeration, preparation of the inoculum, sterilization, inoculation and the like are conventional and may be similar to those for the production of chlortetracycline shown in the United States patent to Duggar No. 2,482,055, for the production of tetracycline shown in the United States patent to Minieri et al. No. 2,734,018, and for the production of 7-chloro-6-demethyltetracycline shown in the United States patent to McCormick et al. No. 2,878,289.

The novel methylation inhibitors of the present invention may be represented by the following general formula:

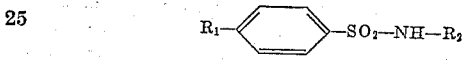

wherein $R_1$ is a member of the group consisting of H and $NH_2$ and $R_2$ is a member of the group consisting of phenyl, pyridinyl, triazinyl, pyridazinyl, pyrimadinyl,

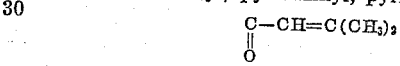

and

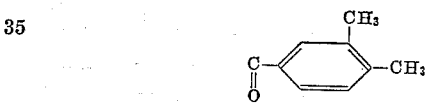

The amount of inhibitor that may be used is a factor of some importance. In general, we have found that a useful range varies from about 10 mg. per liter to about 1,000 mg. per liter. The novel inhibitors may also be used in the form of their alkali metal and/or alkaline earth metal salts if desired.

It has also been observed that the action of the methylation inhibitors of the present invention can be reversed by the addition of p-aminobenzoic acid and/or folic acid. Thus, if p-aminobenzoic acid or folic acid is added to the fermentation medium along with a methylation inhibitor such as sulfadiazine no inhibition of 6-methylation of the naphthacene ring structure is observed.

The invention will be described in greater detail in conjunction with the following specific examples.

EXAMPLE 1

*Production of 7-chloro-6-demethyltetracycline*

An inoculum medium is prepared according to the following formula:

| | Grams |
|---|---|
| Sucrose | 30 |
| Corn steep liquor | 20 |
| $(NH_4)_2SO_4$ | 2 |
| $CaCO_3$ | 7 |

Water to 1000 milliliters.

One hundred-milliliter aliquots of this inoculum are placed in each of a series of 500-milliliter flasks. The flasks and their contents are sterilized in an autoclave for 20 minutes at a pressure of 15 pounds per square inch, then cooled to 25°±5° C. Spores of *Streptomyces aureofaciens* strain S-77 are washed from a nutrient agar slant with sterile distilled water to form a suspension containing approximately 1×10⁸ spores per milliliter. A 1.0-milliliter aliquot of this suspension is added to a 500-milliliter flask containing 100 milliliters of sterile cooled medium. The flask containing the seeded medium is incubated at 28° C. for 24 hours on a reciprocating shaker operating at the rate of 116 oscillations per minute.

A fermentation medium is prepared according to the following formula:

| | Grams |
|---|---|
| Starch | 55.0 |
| Corn steep liquor | 25 |
| $CaCO_3$ | 9 |
| $(NH_4)_2SO_4$ | 5 |
| $MgCl_2.6H_2O$ | 2 |
| $NH_4Cl$ | 1.5 |
| $FeSO_4.7H_2O$ | 0.060 |
| $ZnSO_4.7H_2O$ | 0.100 |
| $MnSO_4.4H_2O$ | 0.050 |
| $CoCl_2.6H_2O$ | 0.005 |
| Water to 1000 milliliters. | |

Twenty-five milliliter portions of this medium are placed in each of a series of 250 milliliter Erlenmeyer flasks, and 0.5 milliliter of lard oil is added to each flask. To one of two flasks (A) chosen from this series, a 1.25 milligram quantity of sodium sulfadiazine is added, the other flask (B) being retained as a control. The contents of flasks (A) and (B) are sterilized for 20 minutes in an autoclave under a pressure of 15 pounds per square inch, then cooled to 25°±5° C. At the termination of the 24-hour inoculum incubation period, 1.0 milliliter aliquots of the vegetative inoculum are added to flasks (A) and (B). The inoculated medium is incubated at 25° C. for 144 hours on a rotary shaker operating at 185 revolutions per minute. Upon completion of the fermentation period, the harvest mash is assayed for 7-chlorotetracycline and for tetracycline. The presence and amount of 7-chloro-6-demethyltetracycline is determined by paper chromatography.

Flask (A) which contains no sodium sulfadiazine assays 3600 mcg./ml. of 7-chlorotetracycline, 480 mcg./ml. of tetracycline, 280 mcg./ml. of 5a(11a)-dehydrochlortetracycline. There is no evidence of 7-chloro-6-demethyltetracycline. Flask (B) which contains 50 mg./liter of sodium sulfadiazine assays 2400 mcg./ml. of 7-chlorotetracycline, 80 mcg./ml. of tetracycline, 130 mcg./ml. of 5a(11a)-dehydrochlortetracycline, and 155 mcg./ml. 7-chloro-6-demethyltetracycline.

EXAMPLE 2

Production of 7-chloro-6-demethyltetracycline

The procedure of the preceding example is repeated except that a series of graded amounts of sodium sulfadiazine is employed. The fermentation mashes after harvest are assayed by paper chromatographic techniques and the following results are obtained:

TABLE 1

| Sulfadiazine, mg./l. | CTC (Fluoro.)¹ mcg./ml. | Paper Strip Chromatographic Assay (A) (Qualitative) | | | | Paper Strip Chromatographic Assay (B) (Semi-Quantitative) mcg./ml. | | | | |
|---|---|---|---|---|---|---|---|---|---|---|
| | | CTC | TC² | A-VIII³ | A-X⁴ | CTC | TC² | A-VIII³ | A-IX⁵ | A-X⁴ |
| 0 | 7,350 | x | x | | x | # | # | | | 187 |
| 10 | 6,900 | x | x | | x | # | # | | | 158 |
| 30 | 3,225 | x | x | x | | # | 173 | 285 | | 140 |
| 50 | 510 | x | x | x | | 230 | 15 | 230 | ±20 | ±20 |
| 70 | 180 | x | x | x | | 75 | | 75 | ±15 | ±15 |

(A) Ethyl acetate saturated with equal volumes of $Na_2HPO_4$ and 4.5% citric acid.
(B) Butyl acetate: 5% trichloroacetic acid: 0.3 M $NaH_2PO_4$ :: 50:10:40 (pH=2.0).
¹ CTC (Fluoro.)=7-chlortetracycline (fluorometric assay).
² TC=Tetracycline.
³ A-VIII=7-chloro-6-demethyltetracycline.
⁴ A-X=7-chloro-5a(11a)-dehydrotetracycline.
⁵ A-IX=6-demethyltetracycline.
x signifies that compound is present.
signifies that compound is off scale; therefore is a major component.

EXAMPLE 3

Production of 7-chloro-6-demethyltetracycline

The procedure of Example 2 is repeated except that specified amounts of herein specified methylation inhibitors are employed in place of sodium sulfadiazine. The fermentation mashes after harvest are assayed by paper chromatographic techniques. The test results are set forth in Table 2 below:

TABLE 2

| Compound | P.p.m. | Paper Strip Chromatographic Assay | | |
|---|---|---|---|---|
| | | Qualitative | Semi-quantitative | |
| | | 7-Chloro-6-demethyl-tetra-cycline | 7-Chloro-6-demethyl-tetra-cycline, mcg./ml. | Chlor-tetra-cycline, mcg./ml. |
| N'-(β,β'-Dimethyl-acroyl) sulfanilamide | 50 | x | | |
| Do | 100 | x | | |
| 2-Sulfanilamido-4,6-dimethyl-s-triazine | 100 | x | | |
| 3-Sulfanilamido-6-methylpyridazine | 100 | x | | |
| 3-Sulfanilamido-4,6-dimethyl-pyridazine | 100 | x | | |
| 3-Sulfanilamido-6-methoxypyridazine | 50 | x | | |
| Do | 100 | x | | |
| 3-Sulfanilamido-6-methylthiopyridazine | 100 | x | | |
| 2-Sulfanilamido-5-methylpyrimidine | 100 | x | | |
| 2-Sulfanilamido-4,6-dimethyl-pyrimidine | 100 | x | | |
| N'-(3,4-dimethyl-benzoyl)-sulfanilamide | 50 | x | | |
| Do | 100 | x | | |
| N'-(3,5-dichlorophenyl)-sulfanilamide | 100 | x | 50 | |
| 2-Sulfanilamido-6-chloropyrazine | 30 | x | 242 | |
| Do | 40 | x | 125 | |
| Do | 50 | x | 50 | |
| p,p'-Diamino-diphenyl-sulfone | 50 | x | 375 | 210 |
| N'-phenylsulfanilamide | 10 | x | 45 | 365 |
| 2-Sulfanilamidopyridine | 500 | x | 88 | 172 |
| 3-Sulfanilamidopyridazine | 50 | x | 365 | 405 |
| Do | 100 | x | 45 | 25 |
| 3-Sulfanilamido-4,5-dimethylpyridazine | 1,000 | x | 169 | 60 |
| 2-Benzenesulfonamido-pyrimidine | 100 | x | 27 | 363 |
| 2-Sulfanilamido-5-chloropyrimidine | 50 | x | 95 | 80 |
| 4-Sulfanilamidopyrimidine | 50 | x | 234 | 566 |
| Do | 100 | x | 130 | 52 |

We claim:
1. A process for producing 7-chloro-6-demethyltetracycline which comprises cultivating a chlortetracycline-producing microorganism of the genus Streptomyces in an aqueous nutrient medium containing assimilable sources of carbohydrate, nitrogen and inorganic salts under submerged aerobic conditions and in the presence of a small amount of a methylation inhibitor having the formula:

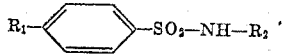

wherein $R_1$ is a member of the group consisting of H and $NH_2$ and $R_2$ is a member of the group consisting of phenyl, pyridinyl, triazinyl, pyridazinyl, pyrimadinyl,

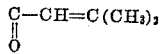

and

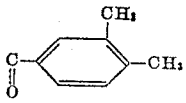

whereby substantial quantities of 7-chloro-6-demethyltetracycline are produced.

2. A process according to claim 1 in which the methylation inhibitor is 2-sulfanilamidopyrimidine.

3. A process according to claim 1 in which the methylation inhibitor is 2-sulfanilamido-6-chloropyrazine.

4. A process according to claim 1 in which the methylation inhibitor is p,p'-diamino-diphenylsulfone.

5. A process according to claim 1 in which the methylation inhibitor is 3-sulfanilamidopyridazine.

6. A process according to claim 1 in which the methylation inhibitor is 4-sulfanilamidopyrimidine.

7. A process for producing 7-chloro-6-demethyltetracycline which comprises cultivating a chlortetracycline-producing strain of *Streptomyces aureofaciens* in an aqueous nutrient medium containing assimilable sources of carbohydrate, nitrogen and inorganic salts under submerged aerobic conditions and in the presence of a small amount of a methylation inhibitor having the formula:

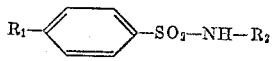

wherein $R_1$ is a member of the group consisting of H and $NH_2$ and $R_2$ is a member of the group consisting of phenyl, pyridinyl, triazinyl, pyridazinyl, pyrimadinyl,

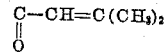

and

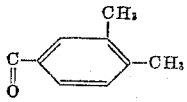

whereby substantial quantities of 7-chloro-6-demethyltetracycline are produced.

8. A process according to claim 7 in which the methylation inhibitor is 2-sulfanilamidopyrimidine.

9. A process according to claim 7 in which the methylation inhibitor is 2-sulfanilamido-6-chloropyrazine.

10. A process according to claim 7 in which the methylation inhibitor is p,p'-diamino-diphenylsulfone.

11. A process according to claim 7 in which the methylation inhibitor is 3-sulfanilamidopyridazine.

12. A process according to claim 7 in which the methylation inhibitor is 4-sulfanilamidopyrimidine.

References Cited in the file of this patent
UNITED STATES PATENTS
2,878,289    McCormick et al. _____ Mar. 17, 1959